United States Patent Office 2,724,649
Patented Nov. 22, 1955

2,724,649

MARGARINE

Percy L. Julian, Maywood, Herbert T. Iveson, Berwyn, and Marian L. McClelland, Harvard, Ill., assignors to The Glidden Company, Cleveland, Ohio, a corporation of Ohio No Drawing. Application March 23, 1951,
Serial No. 217,302

7 Claims. (Cl. 99—123)

This invention relates to improvements in margarine, and to the improved margarines.

Margarine as it is normally produced in commerce is an emulsion of water phase and an oil phase together with small amounts of other ingredients. The oil is usually the external phase. Under usual frying conditions, the margarine tends to separate into two layers since heat breaks the emulsion. The water droplets, being heavier than oil, collect underneath the oil and become superheated. This causes the water to burst out of its fatty enclosure with explosive violence giving rise to the phenomenon commonly known as spattering.

Past experience has shown that this difficulty can be overcome more or less successfully by incorporating in the margarine interface modifiers which disperse this water phase in the oil phase even at cooking temperatures, allowing the fine water droplets to evaporate quietly without undue superheating. A number of interfacial modifiers have been proposed and considered for use as emulsifiers or dispersing agents in margarine to assist in overcoming spattering. Vegetable phosphatides, commonly called vegetable lecithins, have been one of the most common of such agents, but they have not been completely successful and the prior art abounds with proposals and attempts to improve their efficiency. To the best of our knowledge, however, the problem has not heretofore been solved satisfactorily. Margarine is a highly competitive product not only as against other margarines but also as against butter. Margarines which simulate butter as closely as possible while yet being producible at costs competitive with other margarines are a main objective in the margarine art. Accordingly, margarine which exhibits no more spattering than butter, and preferably less spattering, is desired, but the costs of interface modifiers which will achieve this goal must be moderate. The commercial vegetable lecithins have been selling in recent years at prices which have been considered low or moderate by margarine manufacturers, and hence constitute a class of interface modifiers which have seemed likely to meet the requirements of anti-spattering interface modifiers if their efficiency could be improved without greatly increasing their cost. At present, usually an additional interface modifier, such as mono- and di-glycerides, is used in conjunction with the vegetable lecithins to produce margarines capable of exhibiting approximately the above-mentioned desirable characteristics of butter. Accordingly, such improvements in vegetable lecithins have long been sought.

We have now found that a particular fraction or moiety of vegetable lecithins is especially adapted for use as an anti-spattering agent in margarines, that when it is incorporated in margarines by itself in very small amounts, it not only substantially eliminates spattering but also imparts to the margarine some additional properties simulating butter. We have also found that the processing steps which are required to provide this fraction in a condition suitable for such use are relatively inexpensive so that the price of the improved interface modifier is currently satisfactory.

Accordingly, it is the principal object of this invention to provide an improved margarine which is substantially free of spattering and which manifests additional properties simulating butter.

Other objects ancillary thereto will be apparent from the following description of our invention.

In our efforts to improve the anti-spattering efficiency of vegetable lecithins, we have found that the alcohol-insoluble moiety of crude vegetable lecithins is an unusually effective anti-spattering agent, and that the alcohol-soluble moiety is substantially ineffective in that function. Moreover, we have found that the two moieties are somewhat antagonistic so that the removal of the alcohol-soluble moiety permits the alcohol-insoluble fraction to function more effectively than it would in the presence of that moiety. In addition, we have found that the alcohol-insoluble moiety imparts to margarine improved foaming characteristics which simulate those of butter. Furthermore, the alcohol-insoluble moiety substantially eliminates the sticky milk curd which heretofore has formed on the bottom of the frying pan. The whole vegetable lecithins which have heretofore been used in margarine as anti-spattering agents and which contain both of the moieties described above, have not provided these latter improvements, so that it will be apparent that the elimination of the alcohol-soluble moiety of the whole mixture has led to unexpected improvements in margarine so far as frying characteristics are concerned.

The improved margarine compositions of the present invention additionally possess high resistance to "water-bleeding," a property characteristic of butter. "Water-bleeding" is evidenced by breakdown of the emulsion and appearance of droplets of water on the surface of the product. As this water evaporates, the surface of the margarine becomes encrusted with salt crystals and the product takes on an unsightly and undesirable appearance. Many margarine compositions are presently available uncolored, and dyestuffs are subsequently incorporated in the margarine to impart a yellow color. During the coloring process, a product having poor emulsion stability will tend to "bleed," and hence be objectionable. We have found that margarines containing whole vegetable lecithins have poor emulsion stability and frequently "bleed." However, margarines prepared with the alcohol-insoluble moiety are characterized by excellent resistance to "water-bleeding" and, in fact, at least are equal to, and in some instances, superior to butter in this respect. Accordingly, it is a surprising result of this invention that margarines which contain the alcohol-insoluble moiety of vegetable lecithins and are substantially free of the alcohol soluble moiety thereof are characterized by substantial freedom from "water-bleeding."

We acknowledge the fact that whole commercial vegetable lecithins can be incorporated in margarine in such amounts as will substantially eliminate spattering, but it has not been practical to use the amounts which are so needed because those amounts impart a distasteful characteristic flavor to the margarine different from that of butter, which is objectionable. In contrast, the amounts of the alcohol-insoluble moiety which suppress spattering do not noticeably alter the flavor of margarines in which they are incorporated. The amount so needed varies, of course, with the formulation of the margarine, the product of some manufacturers requiring more than others. When the margarine is substantially free of the alcohol-soluble fraction, an amount of the alcohol-insoluble moiety more than about 0.50% is seldom needed, and we prefer to use amounts between about 0.10% and 0.30%. However, as little as .05% of the alcohol-insoluble moiety reduces the spattering of a margarine which is substantially free of the alcohol-soluble moiety of crude lecithins.

The antagonistic influence of the alcohol-soluble moiety is strikingly demonstrated by comparing the foaming characteristics of a margarine which contains only the alcohol-insoluble moiety with the same margarine which contains whole lecithins. When the latter margarine is heated in a frying pan (under conditions such as described below for the spatter test), it spatters more or less depending on the amount of the whole vegetable lecithins present, but in addition it is prone to form large bubbles on its surface, only a few of such bubbles occurring at any particular time. When these bubbles break, the force is sufficient to expel appreciable amounts of fat from the pan. In contrast, a margarine which is substantially free of the alcohol-soluble moiety of the whole vegetable lecithins may be induced by the addition of small amounts of the alcohol-insoluble moiety thereof to develop a nearly complete layer of foam or very small bubbles on its surface. When these small bubbles break, the force and the amount of fat in contact with them is so slight that practically no fat is expelled from the pan by that action. Accordingly the mass of heated margarine rests in the pan in a quiescent, foam-covered layer, the only evidence of activity in it being the sporadic breaking of tiny bubbles of foam here and there, although water is being continuously evaporated from the oil. From what has been said it will be apparent that the improved margarine therefore behaves substantially like butter being at least as "quiet" if not quieter.

Spatter tests also demonstrate the antagonistic effect of the alcohol-soluble moiety on the alcohol-insoluble moiety. Such tests are carried out in a 6" frying pan which has been brought to a temperature of about 320° F. and which is continuously heated so as to stay at about that temperature. Two ounces of margarine is placed in the pan and a large sheet of paper is then placed over the pan at an elevation of about 3 inches above it. The margarine is heated until all evidence of evaporation has ceased and the paper is then removed, observed and compared with sheets obtained from previous tests. It will be understood that most of the fat which is spattered from the pan during the test strikes the sheet of paper and is absorbed therein, leaving grease spots. The number and size of the spots enables an experienced operator to reach a qualitative estimate of the amount and violence of the spattering, and to estimate the relative efficiencies of different amounts and kinds of anti-spattering agents which are so tested. While the test is not a quantitative one, still it is effective in enabling the operator to tell when substantially no spattering occurs and to readily distinguish that condition from those where even moderate spattering occurs. By applying such a test to a representative margarine formulation, we have found that 0.1% of the alcohol-insoluble moiety uniformly dispersed in the margarine will substantially eliminate spattering while 0.3% of whole vegetable lecithins is required in the same margarine to secure the same result. Since the alcohol-insoluble moiety constitutes roughly one-half of the whole vegetable lecithins, it will be seen that .15% of the alcohol-insoluble moiety is required when the alcohol-soluble moiety is also present, whereas only 0.1% of it is required in the absence of the alcohol-soluble moiety. Thus the presence of the alcohol-soluble moiety reduces the effectiveness of the insoluble moiety by about 33%. In other words, only two-thirds as much of the insoluble moiety is needed when the margarine is substantially free of the alcohol-soluble moiety.

We believe that the antagonistic effect of the alcohol-insoluble moiety can be explained at least in part by the observed fact that the alcohol-soluble moiety tends to promote oil-in-water emulsions, while the alcohol-insoluble moiety promotes water-in-oil emulsions. As mentioned earlier, margarine is essentially an emulsion of the latter type, and hence tends to be stabilized by the alcohol-insoluble moiety. When both fractions are present, however, they tend to counteract each other; that is, the alcohol-soluble moiety tends to make the water-in-oil emulsion less stable, and the heat which is applied during frying further aids in breaking that emulsion. By eliminating the alcohol-soluble moiety, the full effectiveness of the insoluble moiety in stabilizing the margarine is achieved, and spattering may consequently be reduced to a minimum if not eliminated completely. While we do not want to be bound by our explanation of the observed effects, we do know as a fact that the whole vegetable lecithins may be separated into two fractions which tend to promote stability in diametrically opposite types of emulsions, and it seems reasonable that such opposition or antagonism accounts in large part for the observed increase in the effectiveness of the alcohol-insoluble moiety when the soluble moiety is absent. In fact, we believe that the antagonistic effect of the alcohol-soluble moiety may act as a water-in-oil emulsion breaker and thus detract from the stability of the margarine composition. Such an effect would promote rather than prevent spattering. What ever the true explanation may be, it should be apparent from the foregoing discussion that elimination of the alcohol-soluble moiety of whole vegetable lecithins from margarine actually increases the efficiency and effectiveness of the remaining insoluble moiety as a water-in-oil interface modifier over what could logically be expected from it if the alcohol-soluble moiety were regarded merely as an inactive diluent.

In the foregoing description of our invention, we have referred to the water-in-oil active fraction as the "alcohol-insoluble" moiety. The separation of the whole vegetable lecithins into its fractions may be done by any of the known procedures, but we have preferred to make use of the different solubilities of the moieties in alcohol as the basis for our separation. Whole vegetable lecithins contain inositol phosphatides, lecithin, cephalin and various other materials. When the whole material is extracted with alcohols such as methanol, ethanol, isopropanol, etc., a portion amounting to roughly 50% dissolves therein while the balance remains undissolved. This insoluble fraction is believed to contain inositol phosphatides as its major constituent together with other phosphatides in lesser amounts, and carbohydrates. Its composition varies somewhat depending on the vegetable source of the whole lecithin and on the processing steps used to isolate the crude lecithins from the other constituents of the source vegetable or vegetable oil-seed. We have found, however, that the alcohol-insoluble moieties of commercial, crude soya and corn phosphatides are equally satisfactory for use in our described invention. We have also found that when the crude vegetable lecithins contain vegetable oils, which in the case of crude whole soya lecithin may be present in amounts of 30-40%, it is unnecessary to remove the oils before isolating the alcohol-insoluble moiety. The resulting product contains oil in addition to the alcohol-insoluble moiety mentioned above, but the oils appear to act only as inert diluents and carriers, so that their presence or absence does not influence the anti-spattering and other described properties if due account is taken of the diluting effect of the oil content. Such a material can be prepared from crude whole vegetable lecithins by washing the latter with alcohols. The resulting alcohol-insoluble moiety then retains a percentage of the original soybean oil, and is soluble in either the oil phase or the water phase of the margarine.

The alcohol-insoluble moiety may be prepared as a dry, oil-free product, and in this form may be incorporated in the water phase of the margarine. This oil-free product may be redissolved in a suitable carrier such as shortening, vegetable oils, animal fats, etc. and then may be incorporated into the oil phase of the margarine. In the commercial practice of this invention, oils similar to those used in the margarine composition will generally be preferred. Such oils are hydrogenated cottonseed oil, hydrogenated soya oil, and mixtures thereof, and for purposes of a broad classification may be termed "margarine oils." However, we do not propose this term as one limited to the oils mentioned hereinabove, but we desire to include any oil which might be used for this purpose, i. e., as a carrier for the alcohol-insoluble moiety. "Margarine oil" includes, therefore, such carriers as oleostearine, cocoanut oil, liquid soya oil, hydrogenated corn oil and the like. Said oils, although not commonly used in margarine manufacture, could be used in this connection and hence are included in the broad definition along with other suitable liquid or plastic oils. The copending application of P. L. Julian and H. T. Iveson, Serial No. 232,868, filed June 21, 1951, describes and claims dispersions of the alcohol-insoluble moiety of vegetal phosphatides in carriers, and describes and claims a process for preparing such dispersions.

We have found that the anti-spattering effects of the alcohol-insoluble moiety may be further enhanced by intimately mixing with it more than about 0.1% but not more than about 1% of protein, such as isolated edible soya protein, enzyme hydrolyzed protein, or alkali-soluble, acid-precipitable vegetable seed protein. Intimate dispersion of the protein into the alcohol-insoluble fraction is necessary to secure such enhancement, however, and may be conveniently achieved by dispersing the protein and the alcohol-insoluble fraction in water. If desired, the dispersion may then be dried. Whether in a wet state, or dry, the dispersion may then be incorporated into the water phase of the margarine. The optimum effect of the intimately dispersed protein appears to be secured when the protein amounts to about 0.5% of the oil-free alcohol-insoluble moiety of an oil-containing preparation of the alcohol-insoluble fraction. About 0.1% of such a material on an oil-free basis is effective in overcoming spattering when uniformly dispersed in margarine.

The following examples are given by way of illustration in order that those skilled in the art may better practice the invention. The examples represent preferred modes of carrying out the invention. Proportions of ingredients used in the examples are, unless otherwise stated, on a weight basis.

*Example 1*

Crude vegetable phosphatides were washed with an equal volume of ethyl alcohol eight separate times. The residual alcohol on the alcohol-insoluble moiety was removed by drying under vacuum. This moiety was dissolved in the oil phase of the margarine in the amount of 0.1% of the final margarine weight. A margarine was produced having superior frying characteristics and minimized spatter.

A margarine produced from the crude vegetable phosphatides was inferior to that produced from the alcohol-insoluble moiety and a margarine produced from the alcohol-soluble fraction was extremely poor.

*Example 2*

A sample of the alcohol-insoluble moiety produced by first removing the oil from the crude soybean phosphatides by washing repeatedly with acetone and then extracting the oil-free phosphatides with ethanol as in Example 1 was dissolved in the water phase of the margarine in an amount of 0.1% of the final margarine weight. The margarine produced was of better quality in frying characteristics than one produced using 0.25% of the crude soybean phosphatides.

*Example 3*

A sample of the alcohol-insoluble moiety produced as in Example 2 was dissolved in a margarine oil (a mixture of hydrogenated cottonseed and soya oils in the approximate ratio of 70% to 30% by weight) to produce a product containing 75% alcohol-insoluble material and 25% margarine oil. This product was added to a margarine mix in amount of 0.1% and prevented spattering exceptionally well in the resulting margarines.

*Example 4*

An alcohol-insoluble moiety prepared as in Example 1 was thoroughly mixed in water with 0.5% of a water-soluble enzyme-hydrolyzed alkali metal globulinate, and the resulting uniform dispersion was dried. 0.1% of this product added to margarine gave results in eliminating spattering during frying equivalent to 0.25% of a product composed of crude vegetable phosphatides similarly combined with a water-soluble enzyme hydrolyzed alkali metal globulinate.

It is to be understood that the foregoing examples are illustrative and that modifications may be made therein without departing from the invention. Thus in place of whole soya lecithin, other whole vegetable lecithins such as corn phosphatides may be employed. Methods other than alcohol extraction which essentially effect a concentration of the alcohol-insoluble moiety are within the scope of this invention. In other words, the method by which the fraction corresponding to that which we herein call the alcohol-insoluble moiety is actually separated or concentrated should constitute no limitation on the inventions hereinafter claimed.

Having described our invention, what we claim is:

1. An improved margarine containing a small amount above about 0.05% of the alcohol-insoluble moiety of whole vegetable lecithins and substantially free of the alcohol-soluble moiety of said vegetable lecithins, said improved margarine being characterized by substantial freedom from spattering and a sticky residue, and by the development of a quiescent layer of foam on its surface, when heated to frying temperatures.

2. An improved margarine as claimed in claim 1 wherein the amount of the alcohol-insoluble moiety is between about 0.10% and 0.30% by weight of the margarine.

3. An improved margarine as claimed in claim 1 wherein said alcohol-insoluble moiety is composed in major amount of inositol phosphatides.

4. An improved margarine as claimed in claim 3 wherein the amount of said alcohol-insoluble moiety is between about 0.10% and 0.30% by weight of the margarine.

5. An improved margarine as claimed in claim 1 which includes a small percentage of protein by weight of said alcohol-insoluble moiety in intimate association with the latter.

6. An additive for margarine comprising the alcohol-insoluble moiety of whole vegetable lecithins in a carrier of margarine oil, said additive being substantially free of the alcohol-soluble moiety of said whole vegetable lecithins.

7. An additive for margarine comprising the alcohol-insoluble moiety of whole vegetable lecithins having protein in intimate association therewith in an amount between about 0.1% and 1% by weight of said moiety, said additive being substantially free of the alcohol-soluble moiety of said whole vegetable lecithins.

References Cited in the file of this patent

UNITED STATES PATENTS

| | | |
|---|---|---|
| Re. 19,767 | Reynolds | Nov. 26, 1935 |
| 1,917,259 | Harris | July 11, 1933 |
| 2,029,261 | Ginn | Jan. 28, 1936 |
| 2,090,537 | Lund | Aug. 17, 1937 |
| 2,640,780 | Mattikow | June 2, 1953 |